US012670202B1

(12) United States Patent　　　　　　(10) Patent No.:　US 12,670,202 B1
Kaddami et al.　　　　　　　　　　　　(45) Date of Patent:　　　Jun. 30, 2026

(54) AUTOMATED NATURAL LANGUAGE ANALYSIS USING PERTURBATIONS

(71) Applicant: Amazon Technologies, Inc., Seattle, WA (US)

(72) Inventors: Saousan Kaddami, Luxembourg (LU); Kourosh Moazami Vahid, Berlin (DE); Amir Zidi, Thionville (FR)

(73) Assignee: Amazon Technologies, Inc., Seattle, WA (US)

( * ) Notice: Subject to any disclaimer, the term of this patent is extended or adjusted under 35 U.S.C. 154(b) by 697 days.

(21) Appl. No.: 18/305,013

(22) Filed: Apr. 21, 2023

(51) Int. Cl.
　　*G06F 16/358*　　　(2025.01)
　　*G06F 40/247*　　　(2020.01)
　　*G06F 40/284*　　　(2020.01)
　　*G06F 40/56*　　　(2020.01)

(52) U.S. Cl.
　　CPC .......... *G06F 16/358* (2019.01); *G06F 40/247* (2020.01); *G06F 40/284* (2020.01); *G06F 40/56* (2020.01)

(58) Field of Classification Search
　　CPC .... G06F 16/358; G06F 40/247; G06F 40/284; G06F 40/56
　　USPC .......................................................... 704/9
　　See application file for complete search history.

(56) References Cited

U.S. PATENT DOCUMENTS

| | | | | |
|---|---|---|---|---|
| 12,481,497 | B2 * | 11/2025 | Deshpande | G06F 8/75 |
| 2015/0286619 | A1 * | 10/2015 | Chakra | G06F 40/56 |
| | | | | 704/9 |
| 2020/0272432 | A1 * | 8/2020 | Shaikh | G06F 8/436 |
| 2023/0141448 | A1 * | 5/2023 | Bv | G06F 40/14 |
| | | | | 715/229 |
| 2023/0178079 | A1 * | 6/2023 | Tran | G06N 20/00 |
| | | | | 704/200 |
| 2023/0185582 | A1 * | 6/2023 | Nogayama | G06F 9/451 |
| | | | | 718/102 |
| 2023/0359659 | A1 * | 11/2023 | Granit | G06F 16/355 |
| 2023/0394040 | A1 * | 12/2023 | Gupta | G06F 16/90324 |
| 2024/0112052 | A1 * | 4/2024 | Barr | G06N 20/00 |
| 2024/0112072 | A1 * | 4/2024 | Sharpe | G06N 20/00 |
| 2024/0112092 | A1 * | 4/2024 | Sharpe | G06N 5/045 |

FOREIGN PATENT DOCUMENTS

CN　　　　112597313　A　*　4/2021　.......　G06F 18/23213

* cited by examiner

*Primary Examiner* — Edwin S Leland, III
(74) *Attorney, Agent, or Firm* — Knobbe, Martens, Olson & Bear, LLP

(57)　　　　　　ABSTRACT

A natural language analysis system processes a data item and recommends similar data items. The natural language analysis system preprocesses the data items. The natural language analysis system encodes the text of the input data item using a machine learning model, such as a transformer model. The natural language analysis system recommends related data items based on the encodings of the data items. The natural language analysis system uses perturbations to provide explanations for the recommendations and/or improve the recommendations.

20 Claims, 7 Drawing Sheets

AUTOMATED NATURAL LANGUAGE ANALYSIS USING PERTURBATIONS

BACKGROUND

In natural language processing, a computer can process human speech, such as text written by a human. Machine learning models can be used to process speech. A natural language processing transformer model can be configured to process sequential input data, such as natural language. Transformers can process the entire input all at once, such as a natural language sentence, paragraph, or document. The attention mechanism—enhancing some parts of the input data while diminishing other parts—for transformers provides context for any position in the input sequence. The attention function for a transformer model can be a mapping between a query and a set of key-value pairs to an output. Transformer models can be trained with unsupervised machine learning.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
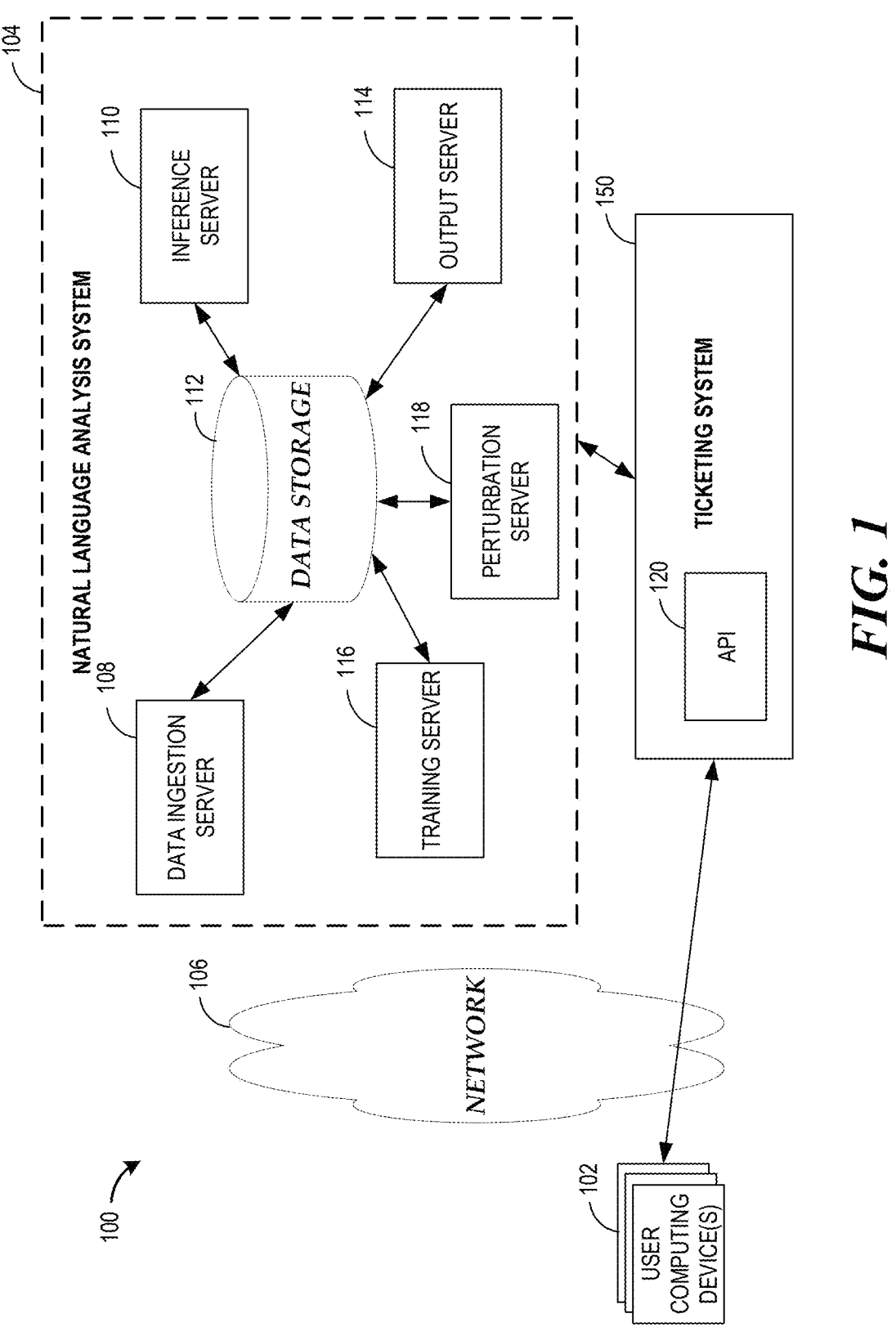
FIG. 1 is a schematic block diagram depicting an illustrative network environment for implementing a natural language analysis system.

Many organizations use ticketing systems to track and solve issues within an organization. Ticketing systems can be used in any context, such as, but not limited to, technical support, programming, user experience, customer support, etc. Users can describe issues they are facing and request assistance via ticketing systems. Engineers or technicians, who can provide such assistance, can view, review, and/or close tickets via the ticketing systems. The engineers or technicians will often have to review each issue carefully and come up with a solution to each issue. This approach can be inefficient in that similar problems may arise over time and the previous solutions to past issues may not be leveraged for new requests. Therefore, existing ticketing systems can lack the capability to reuse past solutions to reoccurring issues.

Generally described, aspects of the present disclosure are directed to machine learned natural language processing and/or information retrieval. A natural language analysis system can process a data item, such as a ticket, and recommend similar data items. In some embodiments, the natural language analysis system can preprocess a data item, such as by preprocessing a title of the data item. The natural language analysis system can encode the text of the input data item using a machine learning model, such as a transformer model. The natural language analysis system can recommend related data items (such as related tickets) based on the encodings of the data items. The natural language analysis system can use perturbations to provide explanations for the recommendations and/or improve the recommendations.

Existing systems for information retrieval can be inefficient. Identifying related data items from a text database based on text similarity can be a slow process. In some aspects, the techniques described herein, such as preprocessing the data items, which can include, but is not limited to, filtering the data items and/or clustering the data items before applying natural language processing can greatly speed up informational retrieval. Accordingly, the systems and methods described herein may improve the operations of a computer for informational retrieval to execute faster than some existing systems.

In the context of machine learning, robustness can refer to the degree that a machine learning model's effectiveness changes when presented with new data versus training data. Some existing machine learning techniques can lack robustness. In other words, some existing machine learning techniques may result in a machine learning model's recommendations being less accurate when presented with new data versus training data. In some aspects, the techniques described herein, such as using some types of perturbations, can advantageously improve the robustness of machine learning models, such as improving the accuracy of existing machine learning techniques. In some aspects, the improvements described herein can improve the robustness of natural language processing models. The ability to highlight text, such as, but not limited to, words and/or sentences, that are important in making inferences can be used to troubleshoot the natural language processing output. Accordingly, the systems and methods described herein may improve machine learning and natural language processing technology.

Due to the nature of machine learning, it can be difficult to sufficiently explain the output of a machine learning model. As described herein, a machine learning model can be used to identify one or more related data items (such as tickets) associated with an input data item (such as a ticket). However, with some existing machine learning techniques, it can be difficult to explain why the techniques identified the one or more data items as being related to the input data item. In other words, if there were certain text in the data items that were important to the specific output, some existing models would provide no insight into the specific text. If recommendations are presented to users, some users may be interested in understanding the text, such as, but not limited to, words and/or sentences, that were important to the specific recommendation. In some aspects, the techniques described herein, such as using some types of perturbations, can advantageously provide specific explanations for machine learning output, such as by providing the words that were significantly relevant to the output. In some aspects, the improvements described herein can improve the explainability of natural language processing models. Therefore, systems and methods described herein may improve machine learning and natural language processing technology.

Turning to FIG. 1, an illustrative network environment 100 is shown in which a natural language analysis system 104 may process and analyze text and provide the results of that analysis. The network environment 100 may include one or more user computing devices 102, the natural language analysis system 104, and a ticketing system 150. The ticketing system 150 can be used to process and catalog customer service requests. The natural language analysis system 104 may include a data ingestion server 108, a training server 116, an inference server 110, an output server 114, a perturbation server 118, and a data storage 112. The constituents of the network environment 100 may be in communication with each other either locally or over a network 106. While certain constituents of the network environment 100 are depicted as being in communication with one another, any constituent of the network environment 100 can communicate with any other constituent of the network environment 100; however, not all of these communication lines are depicted in FIG. 1. For example, any of the data ingestion server 108, the training server 116, the inference server 110, the perturbation server 118, and the output server 114 can communicate directly with each other.

The ticketing system 150 can provide graphical user interfaces to users. The user computing device 102 can access the graphical user interfaces provided by the ticketing system 150. End users who are seeking assistance can create and submit tickets via the ticketing system 150. Other users (such as engineers or technicians), who can provide such assistance, can view, review, and/or close tickets via the ticketing system 150. For example, a user, via the ticketing system 150, can review an open ticket, take some action, and then close the ticket. The ticketing system 150 can be used in any context, such as, but not limited to, technical support, programming, user experience, customer support, etc. User computing devices 102 can include, but are not limited to, a laptop or tablet computer, personal computer, personal digital assistant (PDA), hybrid PDA/mobile phone, smart wearable device (such as a smart watch), mobile phone, and/or a smartphone.

In some embodiments, the ticketing system 150 can include an Application Programming Interface (API) 120. The natural language analysis system 104, via the data ingestion server 108, can receive one or more tickets (such as a new open ticket) via the API 120 and can store corresponding data in the data storage 112. An inference server 110 can make one or more inferences based on input ticket data (such as data for a new open ticket) in the data storage 112. For example, the inference server 110 can identify one or more tickets (such as tickets that have previously been resolved) that are related to the input ticket using one or more machine learning models. In some embodiments, the output server 114, via the API 120, can add supplemental data to the input ticket (such as adding comments to a new open ticket that include the resolutions of the related tickets). Thus, users can review a new open ticket and can automatically be presented with information about how similar problems were solved.

The data ingestion server 108, via the API 120, can receive historical tickets. The data ingestion server 108 can preprocess ticket data from the historical tickets and can store the preprocessed data in the data storage 112. The training server 116 can train one or more machine learning models based on data from the data storage 112, such as the historical ticket data. The perturbation server 118 can perturb and compare text, the results of which can be presented in a graphical user interface and/or used to improve machine learning model(s).

The data storage 112 may be embodied in hard disk drives, solid state memories, or any other type of non-transitory computer readable storage medium. The data storage 112 may also be distributed or partitioned across multiple local and/or remote storage devices. The data storage 112 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

The user computing devices 102, the natural language analysis system 104, and/or the ticketing system 150 may each be embodied in a plurality of devices. Each of the user computing device 102, the natural language analysis system 104, and/or the ticketing system 150 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the user computing devices 102, the natural language analysis system 104, and/or the ticketing system 150. The memory generally includes RAM, ROM, and/or other persistent and/or auxiliary non-transitory computer readable storage media.

Additionally, in some embodiments, the natural language analysis system 104 and/or the ticketing system 150 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
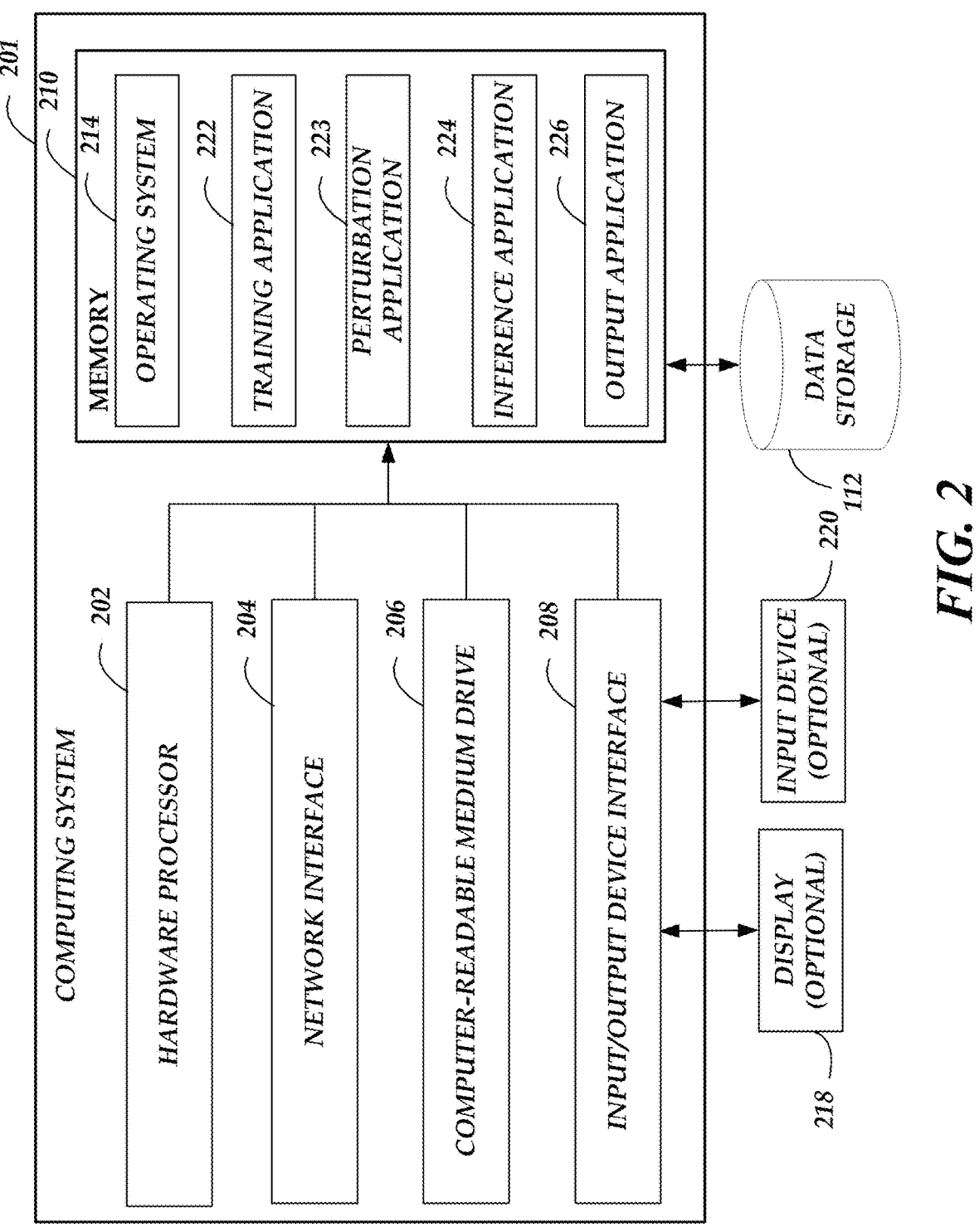
FIG. 2 is a schematic diagram depicting an illustrative general architecture of a computing system for implementing the natural language analysis system referenced in the network environment depicted in FIG. 1.
Figure 3:
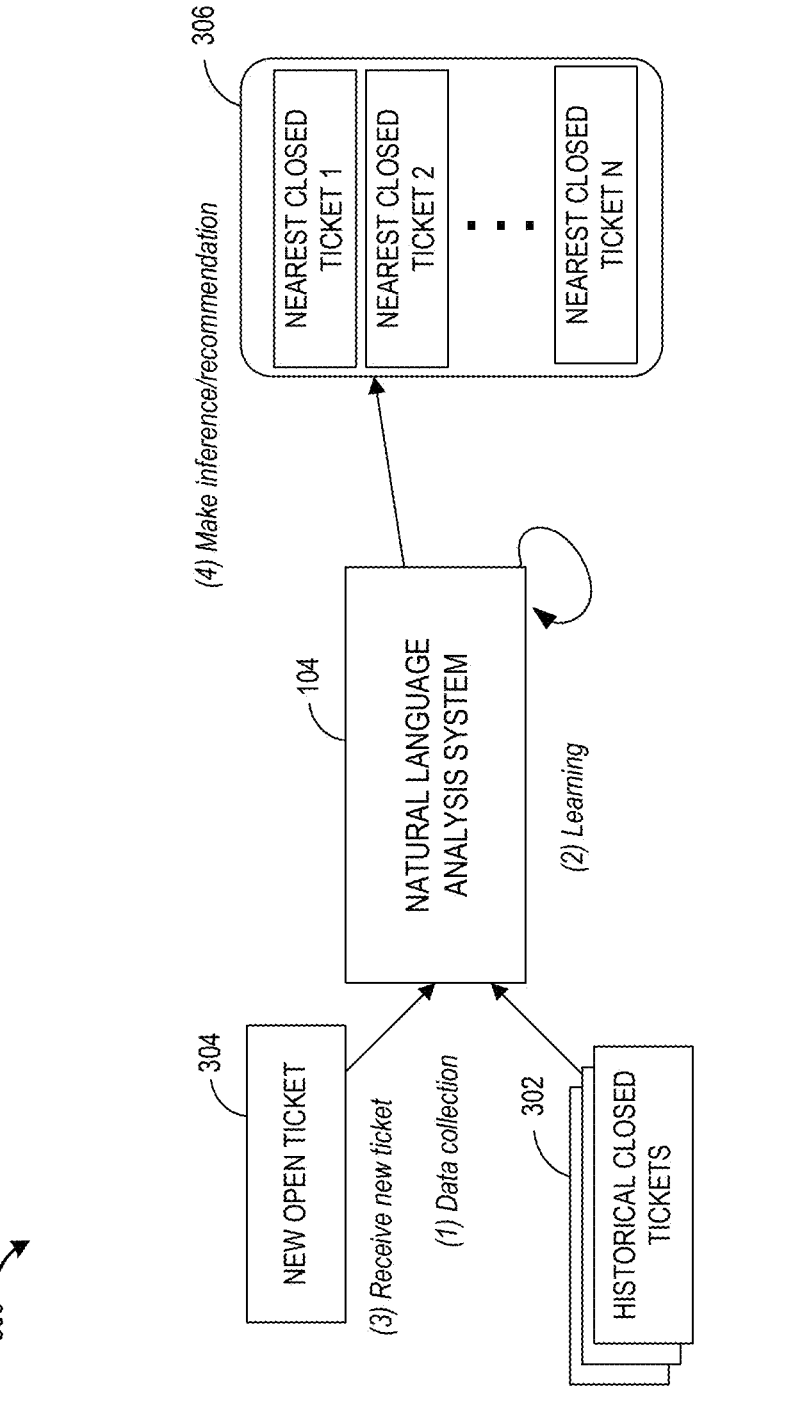
FIG. 3 is a flow diagram depicting illustrative interactions for natural language recommendations.

FIG. 2 is a schematic diagram of an illustrative general architecture of a computing system 201 for implementing a computing device within the natural language analysis system 104 and/or the ticketing system 150 referenced in the environment 100, 300 in FIGS. 1 and 3. The computing system 201 includes an arrangement of computer hardware and software components that may be used to execute the training application 222, the perturbation application 223, the inference application 224, and/or the output application 226. The general architecture of FIG. 2 can be used to implement other devices described herein, such as the user computing device 102 referenced in FIG. 1. The computing system 201 may include more (or fewer) components than those shown in FIG. 2. Further, other computing systems described herein may include similar implementation arrangements of computer hardware and/or software components.

The computing system 201 for implementing a device within the natural language analysis system 104 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the natural language analysis system 104. The memory 210 generally includes RAM, ROM and/or other persistent or non-transitory computer-readable storage media. The memory 210 may store an operating system 214 that provides computer program instructions for use by the hardware processor 202 in the general administration and operation of the device within the natural language analysis system 104.

The memory 210 may include a training application 222, an inference application 224, a perturbation application 223, and/or an output application 226 that may be executed by the hardware processor 202. In some embodiments, the training application 222, the perturbation application 223, the inference application 224, and/or the output application 226 may implement various aspects of the present disclosure. In some embodiments, data items can be preprocessed; the training application 222 can train and/or retrain machine learning model(s); the inference application 224 can identify one or more data items related to an input data item; the perturbation application 223 can perturb and compare text; and/or the output application 226 can output data associated with the identified one or more data items.

With reference to FIG. 3, in some embodiments, illustrative interactions are depicted for natural language recommendations. The environment 300 of FIG. 3 can be similar to the environment 100 of FIG. 1. The environment 300 of FIG. 3 can include the natural language analysis system 104. Other interactions (not illustrated) may be possible in accordance with the present disclosure in other embodiments.

Similar to the communication depictions of FIG. 1, not every possible communication may be depicted in FIG. 3.

The interactions of FIG. 3 begin at one (1), where the natural language analysis system 104 can receive the historical closed tickets 302. At two (2), the natural language analysis system 104 can perform machine learning on the historical closed tickets 302, such as unsupervised machine learning. At three (3), the natural language analysis system 104 can receive a new open ticket 304. At four (4), the natural language analysis system 104 can make an inference, such as recommending a threshold number of nearest closed tickets 306. The natural language analysis system 104 can apply a machine learning model to the text from the new open ticket 304, which outputs an encoded vector. The natural language analysis system 104 can access the encoded vectors for historical closed tickets 302 and apply a nearest neighbor algorithm to the encoded vectors to identify the nearest vectors to the vector for the new open ticket 304. In some embodiments, the natural language analysis system 104 can determine closeness of vectors using a cosine distance calculation. The natural language analysis system 104 can determine a threshold number of historical closed tickets 302 that are nearest to the new open ticket 304 within a cluster. In some embodiments, the natural language analysis system 104 can cause comment(s) to be added, in the ticketing system 150, to the new open ticket 304 indicating the recommended nearest closed tickets. Accordingly, engineers or technicians using the ticketing system 150 can review the new open ticket 304 and be presented with the solutions for the nearest closed tickets 306, which can allow the engineer or technician to resolve the issue for the new open ticket 304 faster.

Figure 4:
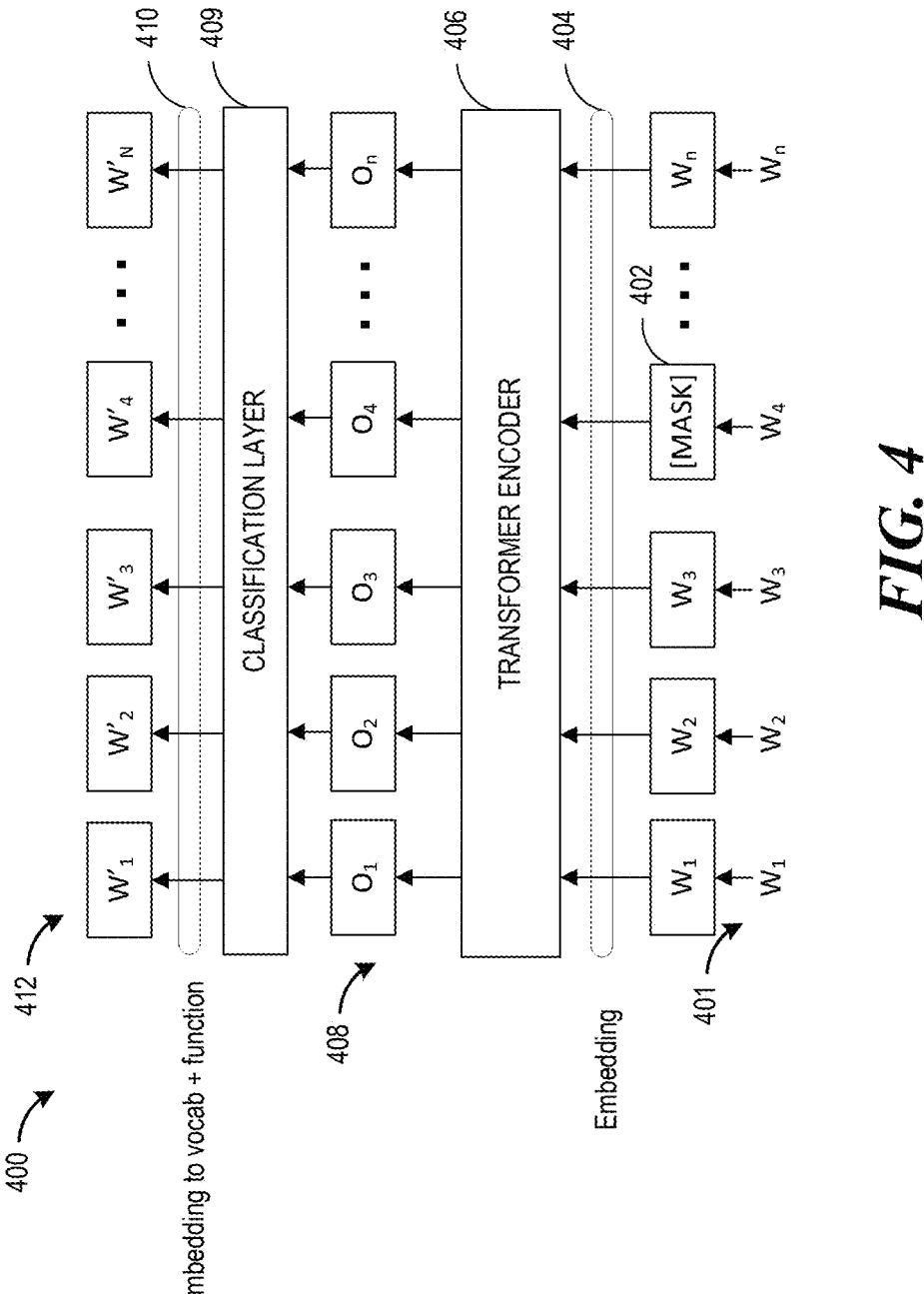
FIG. 4 is a schematic block diagram depicting an illustrative machine learning model used by the natural language analysis system.

Turning to FIG. 4, an illustrative machine learning model 400 is shown. In some embodiments, the machine learning model 400 can be an attention-based and/or neural-network-based machine learning model, such as, but not limited to, a bidirectional encoder representations from transformers (BERT) model. In some embodiments, the machine learning model 400 can be pre-trained with generic data for language modeling, such as, but not limited to, masking a threshold number of words (such as 15% of words) and the training objective could be to predict the original word given its context. In some embodiments, the machine learning model 400 can be pre-trained for next sentence prediction.

During training, the training server 116 can receive input tokens 401. The input tokens 401 can be a word or a part of a word. As shown, the training server 116 can mask some of the tokens, such as the masked token 402. In some embodiments, the training server 116 can use different values for the mask, such as a "[MASK]" token for some threshold number of tokens (such as 80%), a pseudo-random word for some other threshold number of tokens (such as 10%), and the original word for another threshold number of tokens (such as 10%). The machine learning model 400 can receive input in a specific format. An application, such as an application executed by the training server 116 or the inference server 110, can convert the words into tokens 401 and use the embedding 404 to translate the tokens 401 into a vector. The application can tokenize a collection of words. The application can add a special token, such as "[September]," to mark the end of a sentence, or the separation between two sentences. The application can add a special token, such as "[CLS]," at the beginning of text. The application can determine token identifiers for each word in the text. As described herein, for training purposes, some of the tokens can be masked. The application can add a sentence embedding to indicate difference sentences in the text. The application can add a position embedding to show a position of a token within the text. The application can access a token dictionary to identify tokens for words. If a word is not in the token dictionary, the application can represent the word as sub-words and/or characters. The application can pass the vector from the embedding 404 to the transformer encoder 406 as input.

The transformer encoder 406 of the machine learning model 400 can have hidden layers, such as, but not limited to, 12 hidden layers. The transformer encoder 406 can be a neural network. The output 408 of the transformer encoder 406 can be a sequence of vectors of size n where each vector corresponds to an input token with the same index. The transformer encoder 406 can encode words from the text into a multi-dimensional vector, such as, but not limited to a 12×768 dimension vector.

The natural language analysis system 104 can retrain the machine learning model 400 using context specific data and unsupervised machine learning. The machine learning model 400 can have a classification layer 409. The application can multiply the output vectors 408 by the embedding matrix 410, transforming the vectors into the vocabulary dimension. The application can calculate the probability of each word 412 in the vocabulary with a mathematical function that converts a vector of numbers into probabilities, such as, but not limited to, a Softmax function.

The inference server 110 can use the trained machine learning model 400 to obtain a representation for each word in the text without using masking. In some embodiments, the inference server 110 can use output 408 from the final hidden layer of the transformer encoder 406 as the representation of the text, which can be a multidimensional vector (such as a vector of 768 dimensions). The inference server 110 can extract the encoded vector from the final hidden layer of the transformer encoder 406. As described herein, the encoded vector for a data item can be used to identify related data items, which can be presented to users of the ticketing system 150.

Figure 5:
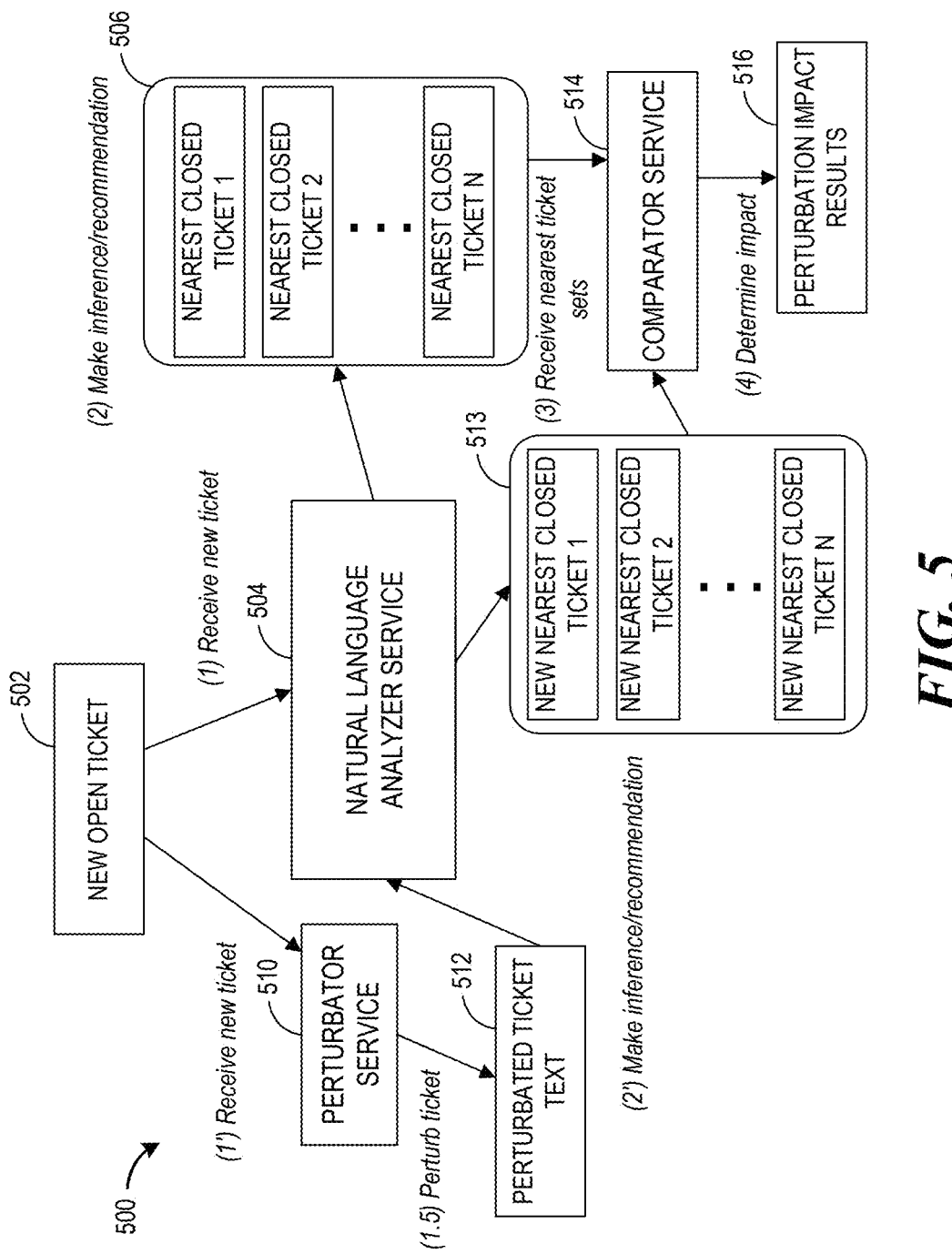
FIG. 5 is a flow diagram depicting illustrative interactions for determining text impact on the natural language recommendations.

With reference to FIG. 5, in some embodiments, illustrative interactions are depicted for determining text impact on natural language recommendations. The environment 500 of FIG. 5 can include a natural language analyzer service 504, a perturbator service 510, and a comparator service 514. The natural language analyzer service 504, the perturbator service 510, and the comparator service 514 can be implemented by devices from the natural language analysis system 104 of FIG. 1. For example, the data ingestion server 108 and the inference server 110 can implement aspects of the natural language analyzer service 504. The perturbation server 118 can implement aspects of the perturbator service 510 and/or the comparator service 514. Other interactions (not illustrated) may be possible in accordance with the present disclosure in other embodiments; not every possible communication may be depicted in FIG. 5.

The interactions of FIG. 5 begin at one (1), where the natural language analyzer service 504 can receive a new open ticket 502. At two (2), the natural language analyzer service 504 can make an inference based on the text from the new open ticket 502, such as recommending a threshold number of nearest closed tickets 506. One (1) and two (2) of FIG. 5 can be similar to three (3) and four (4) of FIG. 3. At one-prime (1'), the perturbator service 510 can receive the new open ticket 502.

At one point five (1.5), the perturbator service 510 can generate perturbated ticket text 512 from the new open ticket 502. Depending on the degree of granularity desired, the perturbator service 510 can vary the type of text that is modified. The perturbator service 510 can make perturbations at the sentence level and/or word level. For example, if the importance of sentences should be determined, the perturbator service 510 can create the perturbated ticket text 512 by modifying a threshold number of sentences (such as a single sentence) by deleting, masking, or otherwise perturbing the sentence. If the importance of words should be determined, the perturbator service 510 can create the perturbated ticket text 512 by modifying a threshold number of words (such as a single word) by deleting, masking, or otherwise perturbing the word. For example, if the text from the open ticket 502 includes, "Computer hardware processor unresponsive," then the perturbator service 510 can generate perturbated ticket text 512 shown in Table 1 below. In particular, each row in Table 1 can be included in different perturbated texts (word granularity) that are individually processed by the natural language analyzer service 504.

TABLE 1

| |
| --- |
| MASK hardware processor unresponsive. |
| Computer MASK processor unresponsive. |
| Computer hardware MASK unresponsive. |
| Computer hardware processor MASK. |

In some embodiments, the perturbator service 510 can vary the type perturbations. The perturbator service 510 can generate perturbated ticket text 512 by replacing words from the new open ticket 502 with synonyms, which can include paraphrases. In some embodiments, the perturbator service 510 can access a synonym database to replace words in the input text. For example, if the text from the open ticket 502 includes, "processor resets once a day," then the perturbator service 510 can generate perturbated ticket text 512 with "CPU rests once a 24 hour interval." In some embodiments, the perturbator service 510 can generate perturbated ticket text 512 by changing letters of words, which can simulate spelling errors.

At two-prime (2'), the natural language analyzer service 504 can make an inference based on the perturbated ticket text 512, such as recommending a threshold number of new nearest closed tickets 513. Two-prime (2') of FIG. 5 can be similar to four (4) of FIG. 3. At three (3), the comparator service 514 can receive the first set of nearest closed tickets 506 associated with the new open ticket 502 and the second set of nearest closed tickets 513 associated with the perturbated ticket text 512. At four (4), the comparator service 514 can determine the perturbation impact results 516 from the first set of nearest closed tickets 506 associated with the new open ticket 502 and the second set of nearest closed tickets 513. In some embodiments, the comparator service 514 can measure impact based on the number of changed nearest neighbors after perturbation. Additionally or alternatively, the comparator service 514 can measure impact based on difference between distances to the original nearest neighbors. In some embodiments, the natural language analysis system 104 can present, in a graphical user interface, the specific text (such as a word or sentence) from a ticket that has a greater impact on nearest neighbors relative to other text from the ticket. In some embodiments, the natural language analysis system 104 can present, in the graphical user interface, a ranking of text (such as words or sentences) from the ticket based on the perturbation impact results 516.

Figure 6A:
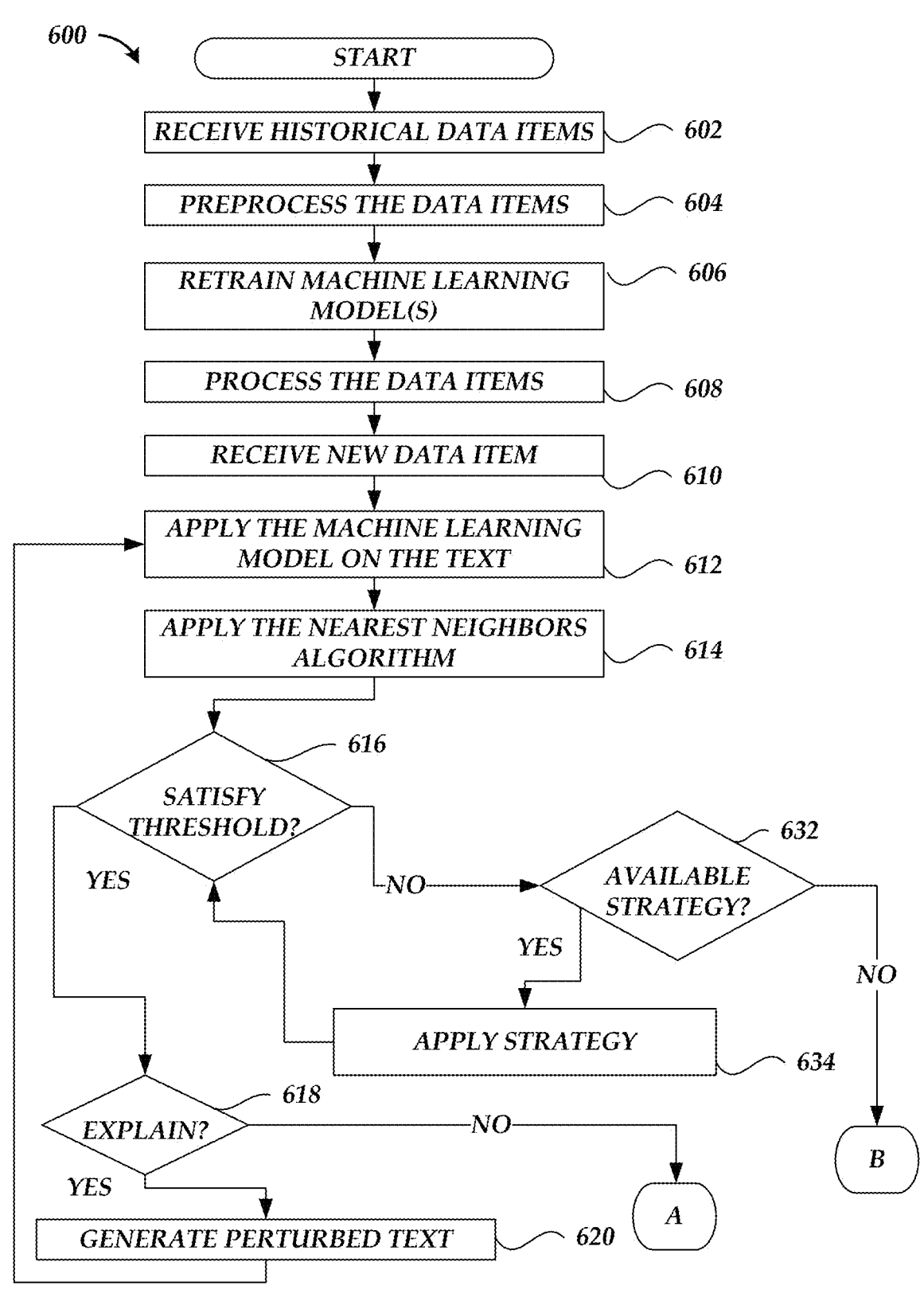
FIGS. 6A-6B are flow charts depicting a method for natural language recommendations.
Figure 6B:
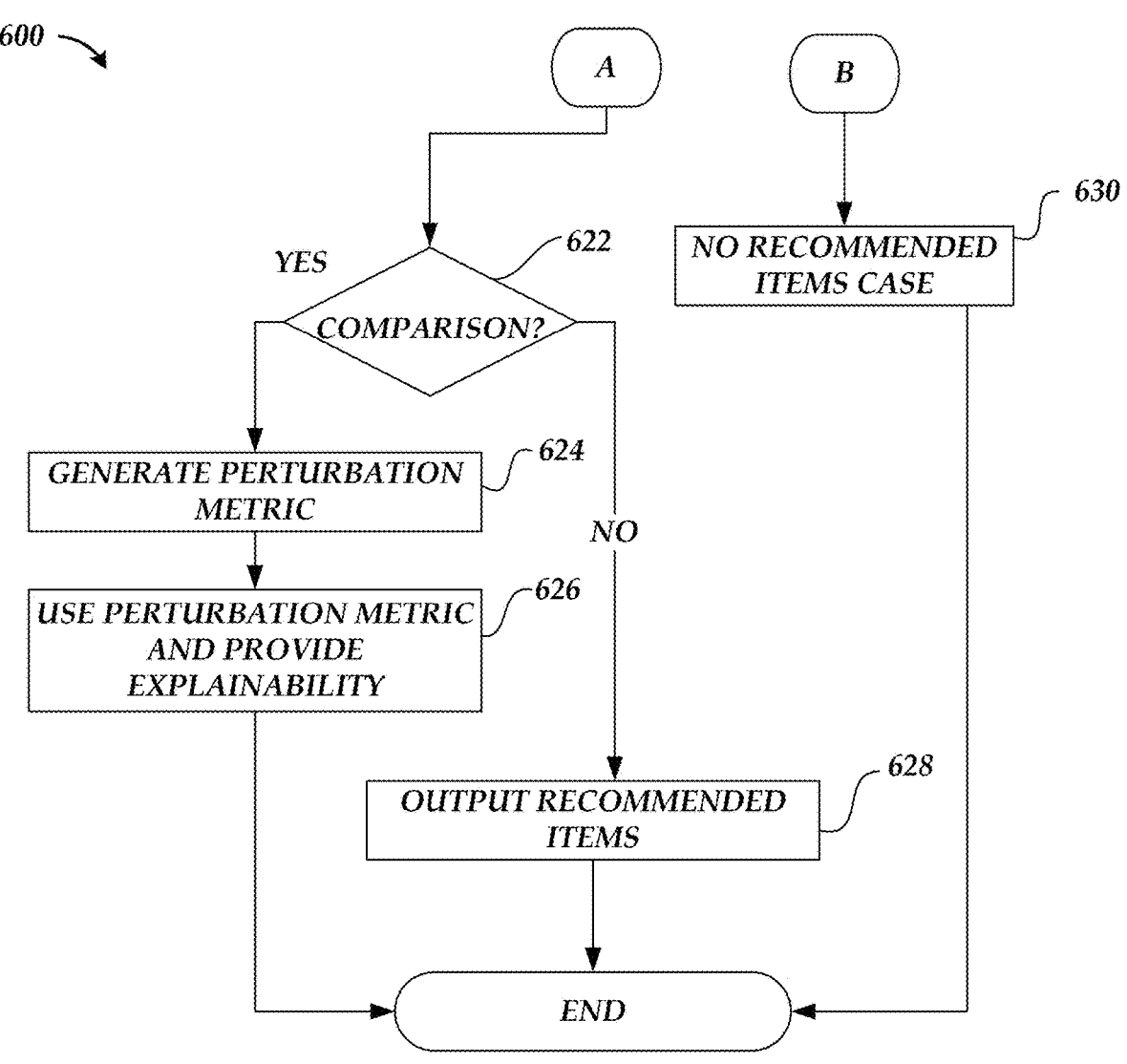

FIGS. 6A-6B include a flow diagram depicting a method 600 implemented by the natural language analysis system 104 and/or the ticketing system for natural language recommendations. As described herein, the natural language analysis system 104 may be implemented with the computing system 201. In some embodiments, the computing system 201 may include the training application 222, the perturbation application 223, the inference application 224, and/or the output application 226, each of which may implement aspects of the method 600. Some aspects of the method 600 may be implemented by the servers of the natural language analysis system 104, such as the data ingestion server 108, the training server 116, the inference server 110, the perturbation server 118, and/or the output server 114. Moreover, some aspects of the method 600 may be described above with respect to FIGS. 3, 4, and 5.

Beginning at block 602, historical data items can be received. The data ingestion server 108 can receive the historical data items from a source, such as, but not limited to the ticketing system 150. As described herein, a data item, can include, but is not limited to, a ticket from the ticketing system 150. The historical data items can be closed historical tickets, such as those tickets with resolutions. The data items can include text, such as a text description of a problem and/or solution. In some embodiments, a data item can include fields, such as category fields or tags. In some embodiments, a data item can include a title. In some embodiments, the data ingestion server 108 can store the historical data items in the data storage 112.

In some embodiments, the ticketing system 150 can have a process by which end users express their issues. Different ticketing systems can have different processes for creating and/or categorizing tickets. Some of these processes can include an end user filling out a questionnaire associated with their issue. In some embodiments, the ticketing system 150 can include workflows, such as decision trees, to categorize tickets and assign custom field values to tickets that descript the type of problem. In other systems, the categories of a ticket can be tagged in a title of the ticket.

At block 604, the data items can be preprocessed. The data ingestion server 108 can preprocess the data items. Depending on the type of ticketing system 150 requesting a recommendation, the data ingestion server 108 can process the data items differently. In some embodiments, the data ingestion server 108 can filter the data items. The data ingestion server 108 can apply one or more filters. In some embodiments, before applying a nearest neighbor algorithm, the data ingestion server 108 can determine a subset of data items. The data ingestion server 108 can determine a subset of data items by identifying data item(s) that include a field value corresponding to a filter value, such as a category value or an issue code. In some embodiments, the data ingestion server 108 can filter data items based on time. For example, the data ingestion server 108 may remove data items that do not satisfy a time threshold (such as being too old).

In some embodiments, the data ingestion server 108 can filter data items based on titles. The data ingestion server 108 can categorize data items based on titles. In information retrieval, term frequency-inverse document frequency ("TF-IDF") can refer to a statistical method that reflects how important a term is to a document in a collection of documents. Term frequency ("TF") can refer to the number of times that terms occur in a document. Inverse document frequency ("IDF") can refer to a measure of how common or rare the terms are in the collection. The data ingestion server 108 can generate a statistical measure from a term frequency-inverse document frequency based on words from titles of the data items. The data ingestion server 108 can generate clusters of data items based on the statistical measure. As described herein, when a new data item request is received, the natural language analysis system 104 can identify, from the clusters, a cluster of data items associated with a title of the new data item request. The natural language analysis system 104 can then apply a nearest neighbor algorithm on the identified cluster of data items.

In some embodiments, the number of clusters can be determined using an elbow method. Applying the elbow method can include varying the number of clusters until a threshold number, K (such as 10). For each value of K, the method calculates the within-cluster sum of square. The within-cluster sum of square can be the sum of squared distance between each point and the centroid in a cluster. As the number of clusters increases, the within-cluster sum of square value may start to decrease. The elbow method includes analyzing the graph to notice when the graph rapidly changes at a point thus creating an elbow shape. From this point, the elbow method suggests using the K value corresponding to the point when the graph starts to move almost parallel to the X-axis as the number of clusters.

In some embodiments, the data ingestion server 108 can apply text preprocessing techniques to the text description of each data item. The data ingestion server 108 can apply text preprocessing techniques, such as, but not limited to, removing digits, removing unnecessary words, stemming, lemmatization, and/or removal of common pieces of portions of text, such as headlines, that are automatically added when a ticket is created. The data ingestion server 108 can store the preprocessed data in the data storage 112.

At block 606, one or more machine learning models can be retrained. The training server 116 can retrain one or more machine learning models. As described herein, the one or more machine learning models can be pre-trained models, such as, but not limited to, a pre-trained BERT model or a generative pre-trained transformer (GPT) model. The training server 116 can retrain the pre-trained machine learning models with use case specific data, such as text data from the historical data items and/or text data used by the groups that use the ticketing system 150. The training server 116 can retrain the one or machine learning models using unsupervised machine learning. In some aspects, it can be advantageous to use pre-trained models, since the pre-trained models can have relatively good performance with general natural language processing and/or finetuning the pre-trained models can be relatively fast with a specific data set. Additional details regarding training machine learning models are described herein, such as with respect to FIG. 4.

At block 608, data items can be processed. The inference server 110 can process the data items, which can be historical data items. The inference server 110 can apply one or more machine learning models that receive text associated with historical data items (such as the preprocessed text data) as input. As described herein, the inference server 110 can determine an encoded vector from the machine learning model based on text data for each of the data items. Additional details regarding processing text data and/or determining encoded vectors are described herein, such as with respect to FIG. 4.

At block 610, a new data item can be received. The data ingestion server 108 can receive the new data item, which can be a new open ticket. As described herein, the new data item can include a text description, a title, and/or metadata, such as, but not limited to, tags, categories, and/or codes. The data ingestion server 108 can preprocess the new data item as described herein, such as with respect to the previous block 604 for preprocessing data items.

At block 612, a machine learning model may be applied based on the text from the new data item. The inference server 110 can apply one or more machine learning models that receive text associated with the new data item (such as the preprocessed text data) as input. As described herein, the inference server 110 can determine an encoded vector based on text data for a new data item using the machine learning model. The inference server 110 can determine an encoded vector for the text data as described herein, such as with respect to the previous block 608 for processing data items. The inference server 110 can extract an encoded vector for the text data from a hidden layer of a machine learning model.

At block 614, a nearest neighbor algorithm can be applied. The inference server 110 can apply a nearest neighbor algorithm to the encoded vector for the new data item. The nearest neighbor algorithm can output a set of data items that are nearest to the encoded vector. As described herein, such as with respect to the previous block 604 for preprocessing data items, the inference server 110 can apply the nearest neighbor algorithm to a filtered subset of data items. The inference server 110 can apply the nearest neighbor algorithm to a subset of data items that include a field value that corresponds to a filter value. For example, if the new data item is associated with category "A," then the inference server 110 can apply the nearest neighbor algorithm to a subset of data items associated with the category "A." As described herein, additionally or alternatively, the inference server 110 can apply the nearest neighbor algorithm to a subset of data items from a cluster of data items based on titles.

In some embodiments, the nearest neighbor algorithm can be a ball tree nearest-neighbor algorithm and/or a KD tree nearest-neighbor algorithm. As described herein, each encoded vector can be a multi-dimensional vector. The inference server 110 can calculate a cosine distance between the encoded vector for the new data item and encoded vectors for other data items. As described herein, the inference server 110 can select a threshold number of data items that are nearest to the encoded vector for the new data item (such as the three nearest neighbors). In some embodiments, the nearest neighbor algorithm can be unsupervised.

At block 616, it can be determined whether the determined nearest neighbors satisfy a threshold value. The inference server 110 can determine that a cosine distance between the encoded vector for the new data item and the nearest neighbor data item satisfies a threshold distance value. In some embodiments, the inference server 110 can previously calculate statistical measure(s) (such as an average and/or standard deviation) distance between pseudo-randomly selected data items and their nearest neighbor data items for a threshold number of data items (such as 1,000 data items). The inference server 110 can use the statistical measure(s) to determine a confidence interval of acceptable threshold distance values. If the nearest neighbors satisfy the threshold value, the method 600 can proceed to block 618 to determine if any explanations should be determined. As described herein, the natural language analysis system 104 can be configured to determine explainable text associated with the new data item and the related set of data items. Otherwise, the method 600 can proceed to block 632 to determine if there any available strategies for execution.

At block 618, it can be determined whether any explanations for the nearest neighbors should be provided. The inference server 110 can determine if any explanations for the nearest neighbors should be provided. In some embodiments, there can be a setting that indicates that explanations should be provided and the inference server 110 can check the setting. Additionally or alternatively, the ticketing system 150, can request, via the API 120, that an explanation should be provided for a nearest neighbor recommendation. If no explanation should be provided or no additional nearest neighbors for explanation purposes are needed, the method 600 can proceed to block 622 of FIG. 6B to determine if there need to be any comparisons. Otherwise, the method 600 can proceed to block 620 to generate perturbed text.

At block 620, perturbed text can be generated. The perturbation server 118 can generate perturbed text data from text data from the new data item. The perturbation server 118 can generate perturbed text data with relatively drastic perturbations versus relatively gradual perturbations. Relatively drastic perturbations can include masking and/or deleting words in text data. Relatively drastic perturbations can advantageously allow explanations to be determined, as described herein. The perturbation server 118 can replace a word in the first text data with a mask token. In some embodiments, depending on a setting or parameter, the perturbation server 118 can vary the granularity of perturbations to determine a corresponding importance of the perturbed portion of text. If the importance of sentences should be determined, the perturbation server 118 can split the text into sentences and then iterate over the sentences to create new texts, where a single sentence is perturbed in the entire text, such as by deleting or masking an entire sentence. If the importance of words should be determined, the perturbation server 118 can split the text into words and then iterate over the words to create new texts, where a single word is perturbed in the entire text, such as by deleting or masking a word in the text. Accordingly, based on the type of granularity, the perturbation server 118 can, given one text description, output multiple texts where one portion in each text has been perturbed (such as one word or sentence in the text). Additional details regarding generating perturbations are described herein, such as with respect to FIG. 5 and Table 1.

The perturbation server 118 can generate perturbed text data with relatively gradual perturbations. The perturbation server 118 can replace a word in the text data with a synonym. The perturbation server 118 can replace a first character in the text data with a second character, which can simulate a typographic error. Similar to the relatively drastic perturbations by the perturbation server 118, the perturbation server 118 can vary the level of granularity for relatively gradual perturbations. Similar to the relatively drastic perturbations by the perturbation server 118, the perturbation server 118 can, given one text description, output multiple texts where one portion in each text has been perturbed (such as one character, word, or sentence in the text). Relatively gradual perturbations can advantageously allow robustness to be estimated, as described herein.

Following the generation of perturbed text, the method 600 can return back to blocks 612, 614, 616 for determining an encoded vector for the perturbed text and applying a nearest neighbor algorithm to the perturbed text. In some embodiments, the method 600 can also determine whether the nearest neighbors for the perturbed text satisfy a threshold at block 616. The inference server 110 can receive a second set of historical data items from the nearest neighbor algorithm for the encoded vector of the perturbed text. Additional details regarding identifying historical data items related to perturbed text are described herein, such as with respect to FIG. 5.

At block 622, it can be determined whether there need to be any comparisons. The inference server 110 can determine that no comparisons are needed if no explanations are needed. If no comparison is needed, the method 600 can proceed to block 628 to output recommended items. In some embodiments, the output server 114 can execute a comment injector, which outputs text from the nearest neighbor data items to the ticketing system 150. Accordingly, users can view the nearest neighbors data items related to a new data item in the ticketing system 150. In some embodiments, if a recommended data item is associated with an automated solution, a system can implement the automated solution automatically or based on human approval. For example, if a previous ticket was resolved by executing a script, the system can automatically execute the script if the previous ticket is recommended for the new open ticket. In some embodiments, the recommended data item can be associated with a solution template that can be applied by an engineer. If a comparison is needed, the method 600 can proceed to block 624 to generate a perturbation metric.

At block 624, a perturbation metric can be generated. The perturbation server 118 can generate a perturbation metric based on the first set of historical data items and the second set of historical items. As described herein, impact can be measured in the number of changed nearest neighbors after perturbation and/or in the difference between the distances to the original nearest neighbors. If a portion of text is important, it may have higher impact when being removed or drastically altered, as compared to an unimportant sentence. Thus, portions of text can be ranked by their importance, which can provide interpretability and/or allow troubleshooting of various problems. To calculate a perturbation metric, the perturbation server 118 can calculate a number of data items different between the first set of data items and the second set of data items.

To calculate a perturbation metric, the perturbation server 118 can calculate a statistical measure indicating a change in cosine distance between the encoded vector for the new data item and encoded vectors for the first set of data items and the second set of data items. A formula for a perturbation metric can be:

$$D = \frac{1}{m} * \sum_{n=1}^{m} |d(U, N_i) - d(P, N_i)|,$$

where U can be the text for the new data item; $N_i$ can be the i-th original nearest neighbor; d can be the distance function; P can be the perturbed text; and m can be the number of considered nearest neighbors.

At block 626, a perturbation metric can be used and explainability can be provided. The output server 114 can use the perturbation metric. The output server 114 can determine an indicator based on the perturbation metric. The output server 114 can provide the indicator to the ticketing system 150. The ticketing system 150 can cause presentation, in a graphical user interface, of the text data for the new data item, the identified set of data items, and the indicator. As described herein, the indicator can provide explainability for the recommendation(s) from the natural language analysis system 104. The ticketing system 150 can cause presentation of the identified set of data items and the explainable text. In some embodiments, the explainable text can include a subset of text from text data from the new data item. Additionally or alternatively, the explainable text can include ranked text data from the new data item. As described herein, the natural language analysis system 104 can determine the explainable text based on the perturbation metric.

In some embodiments, the indicator can be or include a ranking of a first portion of the text data relative to a second portion of first text data (such as words or sentences). The ranking can be shown in the graphical user interface (such as a number indicator identifying portions of text from most to least important). In some embodiments, the indicator can be or include a subset of the text data. For example, if a portion of the text data (such as a word or sentence) is the most important as identified by the perturbation metric, that portion of the text data can be identified to the ticketing system 150. Accordingly, the ticketing system 150 can present, in the graphical user interface, the subset of the text data as visually distinct from a remainder of the text data (such as by highlighting or underling the portion of text). In some embodiments, the perturbation metric for a first portion of text (such as number of nearest neighbors changed or a statistical measure based on cosine distance) can be higher than a perturbation metric for a second portion of text, which can indicate importance of the first portion of text relative to a second portion of text. As described herein, providing explainability can allow a user to understand the recommendation better and/or allow the machine learning model to be improved. For example, a developer can improve the robustness of the machine learning model based on the feedback from the perturbation metric.

At block 632, it can be determined whether there any available strategies for execution. If a strategy is available for execution, the method 600 can proceed to block 634 to apply the strategy. Otherwise, the method 600 can proceed to block 630 for the case where there are insufficient data items to recommend. At block 634, there are insufficient data items to recommend. The output server 114 can provide a null value to the ticketing system 150. In some embodiments, the output server 114 can send a message to the ticketing system regarding the potential uniqueness of the new data item. As described herein, this can be a result of the non-existence of similar cases, the presence of an outlier, and/or a first problem occurrence.

At block 634, a strategy can be applied. The inference server 110 can apply a strategy different from the default strategy (such as the default strategy being using a BERT model for encoding text). The inference server 110 can select a particular machine learning model from several machine learning models. The inference server 110 can apply one or more strategies. As depicted, in some embodiments, the inference server 110 can iteratively apply different, escalating strategies until sufficient nearest neighbors are identified or there are no more strategies available for application. In some embodiments, the escalating strategies can be applied in the following order: 1) try a different variant of the default encoding model (such as BERT) for encoding; 2) modify the preprocessing to limit the nearest titles cluster (such as a 10 limit sized cluster of data items), then look for the nearest texts within the limited data set; 3) modify the nearest titles' set to the smallest-sized cluster, apply an encoding model (such as GPT) different from the default model (such as BERT), and/or try different variants of an alternate encoding model (such as different variants of GPT); 4) modify the nearest titles' set to the smallest-sized cluster and/or apply TF-IDF model on the text; and/or 5) create several different rankings of nearest neighbors through different models (such as BERT, GPT, and TF-IDF), normalize the distances (effectively creating an ensemble model), and look for the nearest neighbors via the results of the ensemble model, such as by using a uniform weighted importance. In other embodiments, a different combination or subset of the foregoing strategies can be applied by the inference server 110, such as only modifying the nearest titles' set to the smallest-sized cluster as a strategy.

While some of the solutions and techniques described herein address natural language processing in a ticketing system context, in other embodiments those same solutions and techniques can be applied to any other context that involves text recommendations that are not for a ticketing system.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can." "could." "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising." "including." "having." and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied. The term "substantially" when used in conjunction with the term "real time" can refer to speeds in which no or little delay occurs.

Disjunctive language such as the phrase "at least one of X, Y, or Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:

a data storage medium to store a plurality of data items, wherein each data item of the plurality of data items comprises text data; and a computer hardware processor in communication with the data storage medium, wherein the computer hardware processor executes computer-executable instructions to at least:

receive, from a ticketing system, a first data item comprising first text data;

determining a first encoded vector based on the first text data using a machine learning model;
apply a nearest neighbor algorithm to the first encoded vector, wherein the nearest neighbor algorithm outputs a first set of data items from the plurality of data items;
generate perturbed text data from the first text data;
determining a second encoded vector based on the perturbed text data using the machine learning model;
apply the nearest neighbor algorithm to the second encoded vector, wherein the nearest neighbor algorithm outputs a second set of data items from the plurality of data items;
generate a perturbation metric from the first set of data items and the second set of data items;
determine an indicator based on the perturbation metric; and
cause presentation, in a graphical user interface, of the first text data, the first set of data items, and the indicator.

2. The system of claim 1, wherein to generate the perturbed text data, the computer hardware processor executes further computer-executable instructions to at least:
replace a word in the first text data with a mask token, wherein the perturbed text data comprises the mask token.

3. The system of claim 1, wherein to generate the perturbed text data, the computer hardware processor executes further computer-executable instructions to at least:
replace a word in the first text data with a synonym, wherein the perturbed text data comprises the synonym.

4. The system of claim 1, wherein to generate the perturbed text data, the computer hardware processor executes further computer-executable instructions to at least:
replace a first character in the first text data with a second character, wherein the perturbed text data comprises the second character.

5. The system of claim 1, wherein the indicator comprises a ranking of a first portion of the first text data relative to a second portion of the first text data, wherein to cause presentation of the indicator, the computer hardware processor executes further computer-executable instructions to at least:
cause presentation, in the graphical user interface, of the ranking associated with the first text data.

6. The system of claim 1, wherein the indicator comprises a subset of the first text data, wherein to cause presentation of the indicator, the computer hardware processor executes further computer-executable instructions to at least:
cause presentation, in the graphical user interface, of the subset of the first text data as visually distinct from a remainder of the first text data.

7. A system comprising:
a data storage medium to store a plurality of data items, wherein each data item of the plurality of data items comprises text data; and
a computer hardware processor in communication with the data storage medium, wherein the computer hardware processor executes computer-executable instructions to at least:
receive, from a ticketing system, a first data item comprising first text data;
determine a first encoded vector based on the first text data using a first machine learning model;

apply a nearest neighbor algorithm to the first encoded vector, wherein the nearest neighbor algorithm outputs a first set of data items from the plurality of data items;
determine, from the first text data, explainable text associated with the first data item and the first set of data items; and
cause presentation, in a graphical user interface, of the first set of data items, and the explainable text.

8. The system of claim 7, wherein to apply the nearest neighbor algorithm to the first encoded vector, the computer hardware processor executes further computer-executable instructions to at least:
calculate a cosine distance between the first encoded vector and a third encoded vector associated with a data item from the first set of data items; and
determine that the cosine distance satisfies a threshold distance value.

9. The system of claim 7, wherein to determine the explainable text associated with the first data item and the first set of data items, the computer hardware processor executes additional computer-executable instructions to at least:
generate perturbed text data from the first text data;
determine a second encoded vector based on the perturbed text data using the first machine learning model;
apply the nearest neighbor algorithm to the second encoded vector, wherein the nearest neighbor algorithm outputs a second set of data items from the plurality of data items;
generate a perturbation metric based on the first set of data items and the second set of data items; and
identify, from the first text data, the explainable text based on the perturbation metric.

10. The system of claim 9, wherein to generate the perturbation metric, the computer hardware processor executes further computer-executable instructions to at least:
calculate a number of data items different between the first set of data items and the second set of data items, wherein the perturbation metric comprises the number of data items.

11. The system of claim 9, wherein to generate the perturbation metric, the computer hardware processor executes further computer-executable instructions to at least:
calculate a statistical measure indicating a change in cosine distance between the first encoded vector and encoded vectors for the first set of data items and the second set of data items, wherein the perturbation metric comprises the statistical measure.

12. The system of claim 7, wherein the computer hardware processor executes further computer-executable instructions to at least:
select the first machine learning model from a plurality of machine learning models.

13. The system of claim 7, wherein to determine the first encoded vector using the first machine learning model, the computer hardware processor executes further computer-executable instructions to at least:
extract the first encoded vector from a hidden layer of the first machine learning model.

14. A computer-implemented method comprising:
receiving a first data item comprising first text data;
determining a first encoded vector based on the first text data using a machine learning model;
applying a nearest neighbor algorithm to the first encoded vector, wherein the nearest neighbor algorithm outputs a first set of data items;

generating perturbed text data from the first text data;

determining a second encoded vector based on the perturbed text data using the machine learning model;

applying the nearest neighbor algorithm to the second encoded vector, wherein the nearest neighbor algorithm outputs a second set of data items;

generating a perturbation metric based on the first set of data items and the second set of data items;

determining an indicator based on the perturbation metric; and causing presentation, in a graphical user interface, of the first text data, the first set of data items, and the indicator.

15. The computer-implemented method of claim 14, further comprising:

determining, from a plurality of data items, a subset of data items based on a filter, wherein applying the nearest neighbor algorithm further comprises:

selecting the first set of data items from the subset of data items.

16. The computer-implemented method of claim 15, wherein the filter comprises a filter value, and wherein determining the subset of data items based on the filter further comprises:

identifying, from the plurality of data items, a data item comprising a field value corresponding to the filter value.

17. The computer-implemented method of claim 14, wherein each data item from a plurality of data items comprises a title and the first data item comprises a first title, the computer-implemented method further comprising:

generating a statistical measure from a term frequency-inverse document frequency (TF-IDF) based on words from each title in the plurality of data items;

generating a plurality of clusters of data items based on the statistical measure; and identifying, from the plurality of clusters of data items, a first cluster of data items associated with the first title, wherein applying the nearest neighbor algorithm further comprises:

selecting the first set of data items from the first cluster of data items.

18. The computer-implemented method of claim 14, wherein the machine learning model comprises a bidirectional encoder representations from transformers (BERT) model.

19. The computer-implemented method of claim 14, wherein the machine learning model comprises a generative pre-trained transformer (GPT) model.

20. The computer-implemented method of claim 14, wherein the nearest neighbor algorithm comprises a ball tree nearest-neighbor algorithm.

\* \* \* \* \*